(12) United States Patent
Bogart

(10) Patent No.: US 11,874,015 B2
(45) Date of Patent: Jan. 16, 2024

(54) ROTARY AIR HOMOGENIZER

(71) Applicant: Air Distribution Technologies IP, LLC, Milwaukee, WI (US)

(72) Inventor: James Eric Bogart, Glen Rock, PA (US)

(73) Assignee: AIR DISTRIBUTION TECHNOLOGIES IP, LLC, Milwaukee, WI (US)

( * ) Notice: Subject to any disclaimer, the term of this patent is extended or adjusted under 35 U.S.C. 154(b) by 83 days.

(21) Appl. No.: 17/389,035

(22) Filed: Jul. 29, 2021

(65) Prior Publication Data
US 2022/0034546 A1 Feb. 3, 2022

Related U.S. Application Data

(60) Provisional application No. 63/058,259, filed on Jul. 29, 2020.

(51) Int. Cl.
*F24F 12/00* (2006.01)
*F24F 7/08* (2006.01)

(52) U.S. Cl.
CPC .............. *F24F 12/006* (2013.01); *F24F 7/08* (2013.01); *F24F 2012/007* (2013.01)

(58) Field of Classification Search
CPC ...... F24F 12/006; F24F 7/08; F24F 2012/007; F24F 2203/1032; F24F 13/04; F24F 2203/104
USPC ......................................................... 165/54
See application file for complete search history.

(56) References Cited

U.S. PATENT DOCUMENTS

| 6,422,299 B1* | 7/2002 | Eriksson ............... F28D 19/048 165/8 |
| 6,442,951 B1* | 9/2002 | Maeda ................ F28D 15/0275 62/93 |
| 7,373,786 B2* | 5/2008 | Moratalla ............. F24F 3/1423 62/271 |
| 9,885,486 B2* | 2/2018 | Wintemute ............ F25B 49/02 |
| 10,401,048 B2 | 9/2019 | Rockwood et al. |
| 2007/0163279 A1* | 7/2007 | Moffitt .................. F24F 3/1423 62/93 |
| 2013/0186118 A1* | 7/2013 | Ohs ......................... F24F 3/153 62/271 |

(Continued)

FOREIGN PATENT DOCUMENTS

| KR | 200363428 Y1 | 10/2004 |
| KR | 100743224 B1 | 7/2007 |

OTHER PUBLICATIONS

Thermotech Enterprises Thermowheel TRSeries Retrofit Wheel Systems, 2019 (8pages). (Year: 2019).*

(Continued)

*Primary Examiner* — Steve S Tanenbaum
(74) *Attorney, Agent, or Firm* — Fletcher Yoder, PC

(57) ABSTRACT

An air mixing system for a heating, ventilation, and air conditioning (HVAC) system includes a conduit configured to receive a first airflow and a second airflow and to discharge the first airflow and the second airflow as a mixed airflow via an outlet of the conduit. The air mixing system also includes a thermal wheel disposed within the conduit. The thermal wheel is configured to direct the first airflow and the second airflow thereacross, rotate within the conduit, and transfer heat between the first airflow and the second airflow.

20 Claims, 10 Drawing Sheets

(56) References Cited

U.S. PATENT DOCUMENTS

2020/0088439 A1* 3/2020 Bhosale ............... F24F 12/006

OTHER PUBLICATIONS

Daikin, Air Terminal Units : Models MQTH, MQFCI and MQFVI, Catalog 903-1, 2015, 106 pgs.
N. Blet et al., Heats Pipes for Temperature Homogenization: a Literature Review, Applied Thermal Engineering, Mar. 4, 2017, pp. 490-509, vol. 118.

* cited by examiner

ROTARY AIR HOMOGENIZER

CROSS REFERENCE TO RELATED APPLICATION

This application claims priority from and the benefit of U.S. Provisional Application Ser. No. 63/058,259, entitled "ROTARY AIR HOMOGENIZER," filed Jul. 29, 2020, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Heating, ventilation, and air conditioning (HVAC) systems are generally configured to provide temperature-controlled air to an internal space. Certain HVAC systems, such as an air handling unit (AHU), may include devices configured to ventilate one or more air flows and/or control a temperature of the one or more air flows that are delivered to the internal space. For example, the HVAC system may receive two or more air flows (e.g., a return air flow from the internal space and an outdoor air flow from an external environment) and mix the two or more air flows to generate a mixed air flow that may be delivered to the internal space. When two or more air flows are combined, but not sufficiently mixed together, there may be stratification within the mixed air flow. In traditional systems, to increase efficiency, conduits may be designed to reduce turbulence, thereby resulting in stratification of air flows over long distances. However, stratification within the mixed air flow results in inconsistencies across the cross section of the mixed air flow, producing hot regions, cold regions, damp regions, and dry regions. The effect of these inconsistencies may cause discomfort to an individual in the internal space, inaccurate measurements taken by sensors, inefficiency of the heat exchangers, damage to HVAC equipment subjected to localized heating or cooling, freeze damage, or other negative consequences.

To reduce stratification of two or more airflows, traditional HVAC systems may utilize components including dampers, baffles, vanes, fins, or similar equipment to create turbulent interactions between the two or more air flows. The arrangement of the components may be static or may be dynamically adjusted using actuators or other modulating devices. Further, traditional air mixing systems may utilize ductwork with an increased length to provide additional room for multiple airflows to properly mix. However, traditional HVAC systems may still be inadequate at reducing an amount of stratification within a mixed air flow and creating a homogenized air flow. Accordingly, it is now recognized that improved HVAC systems, such as improved AHUs, for generating mixed or homogenized air flows are desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, an air mixing system for a heating, ventilation, and air conditioning (HVAC) system includes a conduit configured to receive a first airflow and a second airflow and to discharge the first airflow and the second airflow as a mixed airflow via an outlet of the conduit. The air mixing system further includes a thermal wheel disposed within the conduit and configured to direct the first airflow and the second airflow thereacross, rotate within the conduit, and transfer heat between the first airflow and the second airflow.

In another embodiment, an air mixing unit for a heating, ventilation, and air conditioning (HVAC) system comprises a conduit, an enthalpy wheel disposed within the conduit, and a motor coupled to the enthalpy wheel. The conduit comprises a first inlet configured to receive a first airflow and a second inlet configured to receive a second airflow, wherein the conduit is configured to direct the first airflow and the second airflow therethrough in a flow direction. The enthalpy wheel is configured to rotate within the conduit and transmit the first airflow and the second airflow therethrough. The motor is configured to induce rotation of the enthalpy wheel.

In another embodiment, a heating, ventilation, and air conditioning (HVAC) system comprises a conduit, a rotary air homogenizer disposed within the conduit, one or more sensors disposed within the conduit, and a controller communicatively coupled to the rotary air homogenizer and the one or more sensors. The conduit comprises a first end and a second end, and the conduit is configured to direct a first airflow and a second airflow through the conduit in a flow direction from the first end to the second end. The rotary air homogenizer is disposed between the first end and the second end and is configured to receive the first airflow and the second airflow, transfer heat between the first airflow and the second airflow, and rotate to impart a lateral velocity to the first airflow and the second airflow and discharge the first airflow and the second airflow as a mixed airflow. The one or more sensors are configured to provide feedback indicative of a temperature of the first airflow, the second airflow, the mixed airflow, or any combination thereof, and the controller is configured to regulate operation of the rotary air homogenizer based on the feedback.

BRIEF DESCRIPTION OF THE DRAWINGS

Various aspects of this disclosure may be better understood upon reading the following detailed description and upon reference to the drawings in which.

DETAILED DESCRIPTION

Figure 1:
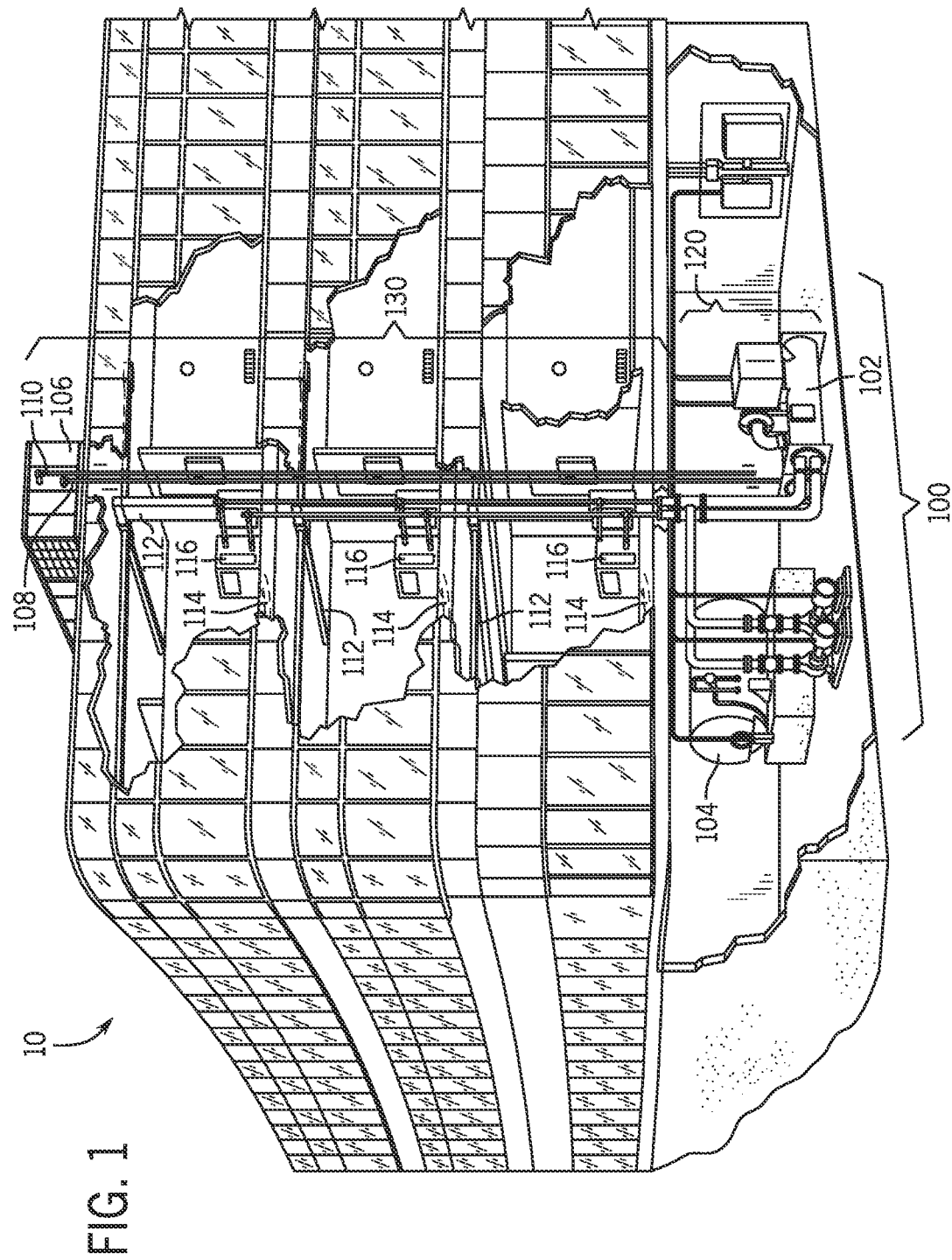
FIG. 1 is a perspective view of a building including an embodiment of a heating, ventilating, or air conditioning (HVAC) system, in accordance with an aspect of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terminals "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure is directed to a heating, ventilation, and air conditioning (HVAC) system or unit, such as an air handling unit (AHU), having a rotary air homogenizer with a thermal wheel or enthalpy wheel configured to mix two or more airflows to generate a homogenized or mixed airflow with a reduced amount of stratification. Thermal wheels or enthalpy wheels utilize a matrix of material having flow passages that enable an air flow to pass through. The flow passages have heat transfer surfaces that transfer heat between the respective air flows and the mass of the wheel matrix material.

In accordance with the present disclosure, the HVAC system may include a waterside system configured to provide a heated or chilled fluid (e.g., working fluid) to heat or cool one or more airflows, and an airside system configured to place the one or more airflows in a heat exchange relationship with the working fluid, thereby conditioning one of the air flows to produce a conditioned airflow to provide to an appropriate space. The airside system may include dampers, baffles, and ductwork configured to direct two or more airflows (e.g., return airflow, supply air flow, outdoor airflow) towards the thermal wheel. For example, the airside system may include a first conduit configured to receive and direct a return airflow towards a first damper (e.g., return air damper) and a second conduit configured to receive and direct an outside airflow towards a second damper (e.g., outside air damper). The first damper and the second air damper may be configured to selectively enable the return airflow and the outside airflow, respectively, to be directed into a third conduit housing the rotary air homogenizer (e.g., the thermal wheel). The temperature and/or humidity of the outside air may be different from that of the return air. For example, the outdoor airflow may have a higher temperature than the return airflow. As the two airflows are directed into the third conduit (e.g., single conduit), the air flows may contact and flow through the thermal wheel disposed within the third conduit. The thermal wheel rotates within the third conduit as the return airflow and outside airflow are directed thereacross. In this way, the thermal wheel may enable mixing of the return airflow and the outdoor airflow within the third conduit. Additionally, the thermal wheel enables heat exchange between the return airflow and the outdoor airflow. For example, the warmer outdoor airflow may transfer heat to the thermal wheel, and the thermal wheel may transfer heat to the cooler return airflow. The use of the thermal wheel facilitates the transfer of heat between the two or more airflows to increase the homogeneity of temperature and humidity in the mixed airflow (e.g., outdoor airflow and return airflow) within the third conduit by both mechanically mixing the two or more air flows and transferring heat between the airflows that have different temperatures upon entering the third conduit.

The above-described configuration of the presently disclosed HVAC unit or system enables suitable mixing of two or more airflows (e.g., a first return airflow from a first portion of a building, a second return airflow from a second portion of the building, an outdoor airflow from an external environment, etc.) to achieve a more homogenized temperature and/or humidity profile in the mixed airflow generated from the two or more airflows, thereby improving HVAC efficiency (e.g., via reduced power consumption). Further, the above-described configurations of the presently disclosed HVAC unit may include ductwork and air passages that are shorter in length compared to traditional systems because mixing of the two or more airflows may be achieved along a shorter flow path, thereby reducing manufacturing costs. These and other features are described in detail below with reference to the drawings.

Turning now to the drawings, FIG. 1 illustrates an embodiment of a heating, ventilating, and air conditioning (HVAC) system 100 for a building 10 that may employ one or more HVAC units (e.g., heaters, chillers, air handling units, pumps, fans, thermal energy storage, etc.) configured to provide heating, cooling, air conditioning, ventilation, and/or other services for building 10. For example, the HVAC system 100 is shown to include a waterside system 120 and an airside system 130. The waterside system 120 may provide a heated or chilled fluid to an air handling unit of the airside system 130. The airside system 130 may use the heated or chilled fluid to heat or cool an airflow provided to the building 10.

As illustrated in FIG. 1, the HVAC system 100 includes a chiller 102, a boiler 104, and a rooftop air handling unit (AHU) 106. The waterside system 120 may use the chiller 102 or the boiler 104 to cool or heat a working fluid (e.g., water, glycol, etc.) and may circulate the working fluid to the AHU 106. In some embodiments, the HVAC devices of the waterside system 120 can be located in or around the building 10 (as shown in FIG. 1) or at an offsite location such as a central plant (e.g., a chiller plant, a steam plant, a heat plant, etc.) that serves one or more buildings including building 10. The working fluid can be cooled in the chiller 102 or heated in the boiler 104, depending on whether heating or cooling is desired in the building 10. The chiller 102 may place the circulated fluid in a heat exchange relationship with another fluid (e.g., a refrigerant) in a heat exchanger (e.g., an evaporator) to absorb heat from the circulated fluid. The boiler 104 may add heat to the circulated fluid by burning a combustible material (e.g., natural gas) or using an electric heating element. The working fluid from the chiller 102 and/or the boiler 104 can be transported to the AHU 106 via piping 108.

The AHU 106 may place the working fluid in a heat exchange relationship with an airflow passing through the AHU 106 (e.g., via one or more stages of cooling and/or heating coils). The airflow can be, for example, outside air, return air from within the building 10, or a combination of both. The AHU 106 may transfer heat between the airflow and the working fluid to provide heating or cooling for the airflow. For example, the AHU 106 can include one or more fans or blowers configured to pass the airflow over or through a heat exchanger containing the working fluid. The working fluid may then return to the chiller 102 or the boiler 104 via piping 110.

The airside system 130 may deliver the airflow supplied by the AHU 106 (i.e., the supply airflow) to the building 10 via supply air ducts 112 and may provide return air from the building 10 to the AHU 106 via return air ducts 114. In some embodiments, the airside system 130 may include multiple variable air volume (VAV) units 116. For example, the airside system 130 is shown to include separate VAV units 116 on each floor or zone of the building 10. The VAV units 116 can include dampers or other flow control elements that can be operated to control an amount of the supply airflow provided to individual zones of the building 10. In other embodiments, the airside system 130 delivers the supply airflow into one or more zones of the building 10 (e.g., via the supply air ducts 112) without using intermediate VAV units 116 or other flow control elements. The AHU 106 can include various sensors (e.g., temperature sensors, pressure sensors, humidity sensors, etc.) configured to measure attributes of the supply airflow. The AHU 106 may receive input from sensors located within the AHU 106 and/or within the building zone and may adjust the flow rate, temperature, or other attributes of the supply airflow through the AHU 106 to achieve setpoint conditions for the building zone.

Figure 2:
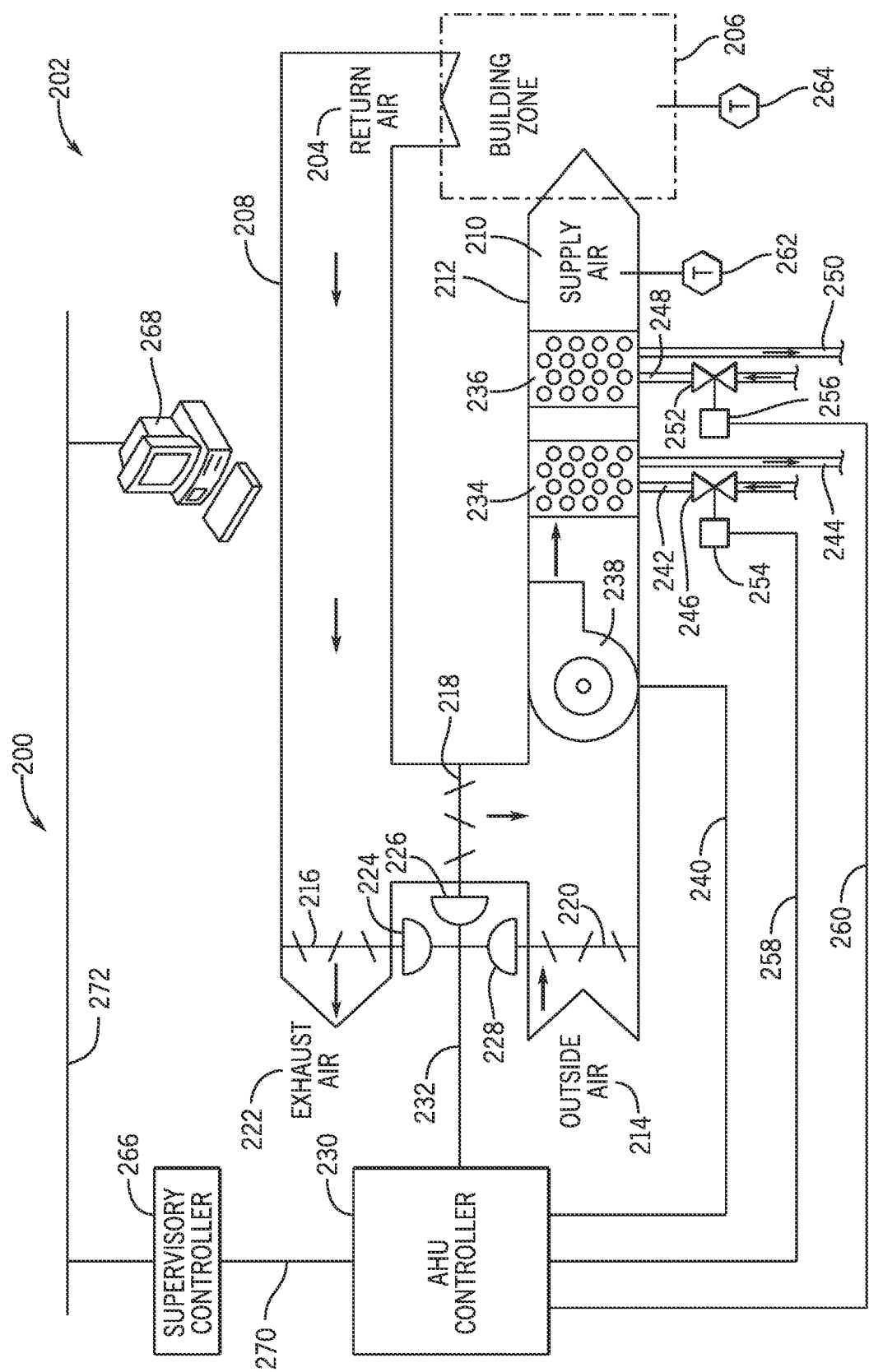
FIG. 2 is a block diagram of an embodiment of an airside system including an air handling unit (AHU) which can be used in an HVAC system, in accordance with an aspect of the present disclosure.

Referring now to FIG. 2, a block diagram of an embodiment of an airside system 200 is illustrated. In some embodiments, the airside system 200 may supplement or replace the airside system 130 in the HVAC system 100 of FIG. 1 or can be implemented separate from the HVAC system 100. When implemented in the HVAC system 100, the airside system 200 may include a number of the HVAC devices in the HVAC system 100 (e.g., AHU 106, VAV units 116, ducts 112-114, fans, dampers, etc.) and can be located in or around the building 10 of FIG. 1. The airside system 200 may operate to heat or cool an airflow provided to the building 10 using a heated or chilled fluid provided by the waterside system 120 of FIG. 1.

As illustrated in FIG. 2, the airside system 200 may include an economizer-type air handling unit (AHU) 202. Economizer-type AHUs vary the amount of outside air and return air used by the AHU 202 for heating or cooling. For example, the AHU 202 may receive return air 204 from a building zone 206 via a return air duct 208, and may deliver supply air 210 to the building zone 206 via a supply air duct 212. In some embodiments, the AHU 202 is a rooftop unit located on the roof of the building 10 (e.g., AHU 106 of FIG. 1) or otherwise positioned to receive both the return air 204 and outside air 214. The AHU 202 may be configured to operate an exhaust air damper 216, a mixing damper 218, and an outside air damper 220 to control an amount of the outside air 214 and the return air 204 that combine to form the supply air 210. Any return air 204 that does not pass through the mixing damper 218 may be exhausted from the AHU 202 through the exhaust damper 216 as exhaust air 222.

The exhaust air damper 216, the mixing damper 218, and the outside air damper 220 may be operated by one or more actuators. For example, the exhaust air damper 216 may be operated by an actuator 224, the mixing damper 218 may be operated by an actuator 226, and the outside air damper 220 may be operated by an actuator 228. The actuators 224, 226, and 228 may communicate with an AHU controller 230 via a communications link 232. The actuators 224, 226, and 228 may receive control signals from the AHU controller 230 and may provide feedback signals to the AHU controller 230. Feedback signals may include, for example, an indication of a current actuator or damper position, an amount of torque or force exerted by the actuators 224, 226, 228, diagnostic information (e.g., results of diagnostic tests performed by actuators 224, 226, 228), status information, commissioning information, configuration settings, calibration data, and/or other types of information or data that can be collected, stored, or used by the actuators 224, 226, and 228. The AHU controller 230 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control the actuators 224, 226, and 228.

Still referring to FIG. 2, the AHU 202 is shown to include a cooling coil 234, a heating coil 236, and a fan 238 positioned within the supply air duct 212. The fan 238 can be configured to force the supply air 210 across the cooling coil 234 and/or the heating coil 236 and provide the supply air 210 to the building zone 206. The AHU controller 230 may communicate with the fan 238 via a communications link 240 to control a flow rate of the supply air 210. In some embodiments, the AHU controller 230 controls an amount of heating or cooling applied to the supply air 210 by modulating a speed of the fan 238.

The cooling coil 234 may receive a chilled fluid from the waterside system 120 of FIG. 1 via piping 242, and may return the chilled fluid to the waterside system 120 via piping 244. A valve 246 may be positioned along the piping 242 or the piping 244 to control a flow rate of the chilled fluid through the cooling coil 234. In some embodiments, the cooling coil 234 includes multiple stages of cooling coils that can be independently activated and deactivated (e.g., by the AHU controller 230, by a supervisory controller 266, etc.) to modulate an amount of cooling applied to the supply air 210.

The heating coil 236 may receive a heated fluid from the waterside system 120 of FIG. 1 via piping 248 and may return the heated fluid to the waterside system 120 via piping 250. A valve 252 may be positioned along the piping 248 or the piping 250 to control a flow rate of the heated fluid through the heating coil 236. In some embodiments, the heating coil 236 includes multiple stages of heating coils that can be independently activated and deactivated (e.g., by the AHU controller 230, by the supervisory controller 266, etc.) to modulate an amount of heating applied to the supply air 210.

Each of the valves 246 and 252 can be controlled by an actuator. For example, the valve 246 can be controlled by an actuator 254, and the valve 252 can be controlled by an actuator 256. The actuators 254 and 256 may communicate with the AHU controller 230 via communications links 258, 260. The actuators 254, 256 may receive control signals from the AHU controller 230 and may provide feedback signals to the AHU controller 230. In some embodiments, the AHU controller 230 receives a measurement indicative of the supply air temperature from a temperature sensor 262 positioned in the supply air duct 212 (e.g., downstream of the cooling coil 234 and/or the heating coil 236). The AHU controller 230 may also receive a measurement indicative of the temperature of the building zone 206 from a temperature sensor 264 located in the building zone 206.

In some embodiments, the AHU controller 230 operates the valves 246 and 252 via the actuators 254, 256 to modulate an amount of heating or cooling provided to the supply air 210 (e.g., to achieve a setpoint temperature for the supply air 210 or to maintain the temperature of the supply air 210 within a setpoint temperature range). The positions of the valves 246 and 252 affect the amount of heating or cooling provided to the supply air 210 by the cooling coil 234 or the heating coil 236, and may correlate with the amount of energy consumed to achieve a desired supply air temperature. The AHU controller 230 may control the temperature of the supply air 210 and/or the building zone 206 by activating or deactivating the coils 234, 236, adjusting a speed of the fan 238, or a combination of both.

Still referring to FIG. 2, the airside system 200 is shown to include the supervisory controller 266 and a client device 268. The supervisory controller 266 may include one or more computer systems (e.g., servers, supervisory controllers, subsystem controllers, etc.) that serve as system level controllers, application or data servers, head nodes, or master controllers for the airside system 200, the waterside system 120, the HVAC system 100, and/or other controllable systems that serve the building 10. The supervisory controller 266 may communicate with multiple downstream building systems or subsystems (e.g., HVAC system 100, a security system, a lighting system, the waterside system 120, etc.) via a communications link 270 according to like or disparate protocols (e.g., LON, BACnet, etc.). In various embodiments, the AHU controller 230 and the supervisory controller 266 can be separate (as shown in FIG. 2) or integrated with one another. In an integrated implementation, the AHU controller 230 may be a software module configured for execution by a processor of the supervisory controller 266.

In some embodiments, the AHU controller 230 receives information from the supervisory controller 266 (e.g., commands, setpoints, operating boundaries, etc.) and provides information to the supervisory controller 266 (e.g., temperature measurements, valve or actuator positions, operating statuses, diagnostics, etc.). For example, the AHU controller 230 may provide the supervisory controller 266 with temperature measurements from the temperature sensors 262, 264, equipment on/off states, equipment operating capacities, and/or any other information that may be used by the supervisory controller 266 to monitor or control a variable state or condition within the building zone 206.

The client device 268 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with the HVAC system 100, its subsystems, and/or devices. The client device 268 may be a computer workstation, a client terminal, a remote or local interface, or any other type of user interface device. The client device 268 may be a stationary terminal or a mobile device. For example, the client device 268 may be a desktop computer, a computer server with a user interface, a laptop computer, a tablet, a smartphone, a PDA, or any other type of mobile or non-mobile device. The client device 268 may communicate with the supervisory controller 266 and/or the AHU controller 230 via a communications link 272. As discussed in further detail below, the AHU 202 may also include an air mixing unit (e.g., rotary air homogenizer) configured to enable mixing of the return air 204 and outside air 214 within the supply air duct 212 to generate the supply air 210 with a more uniform temperature and/or humidity distribution.

Figure 3:
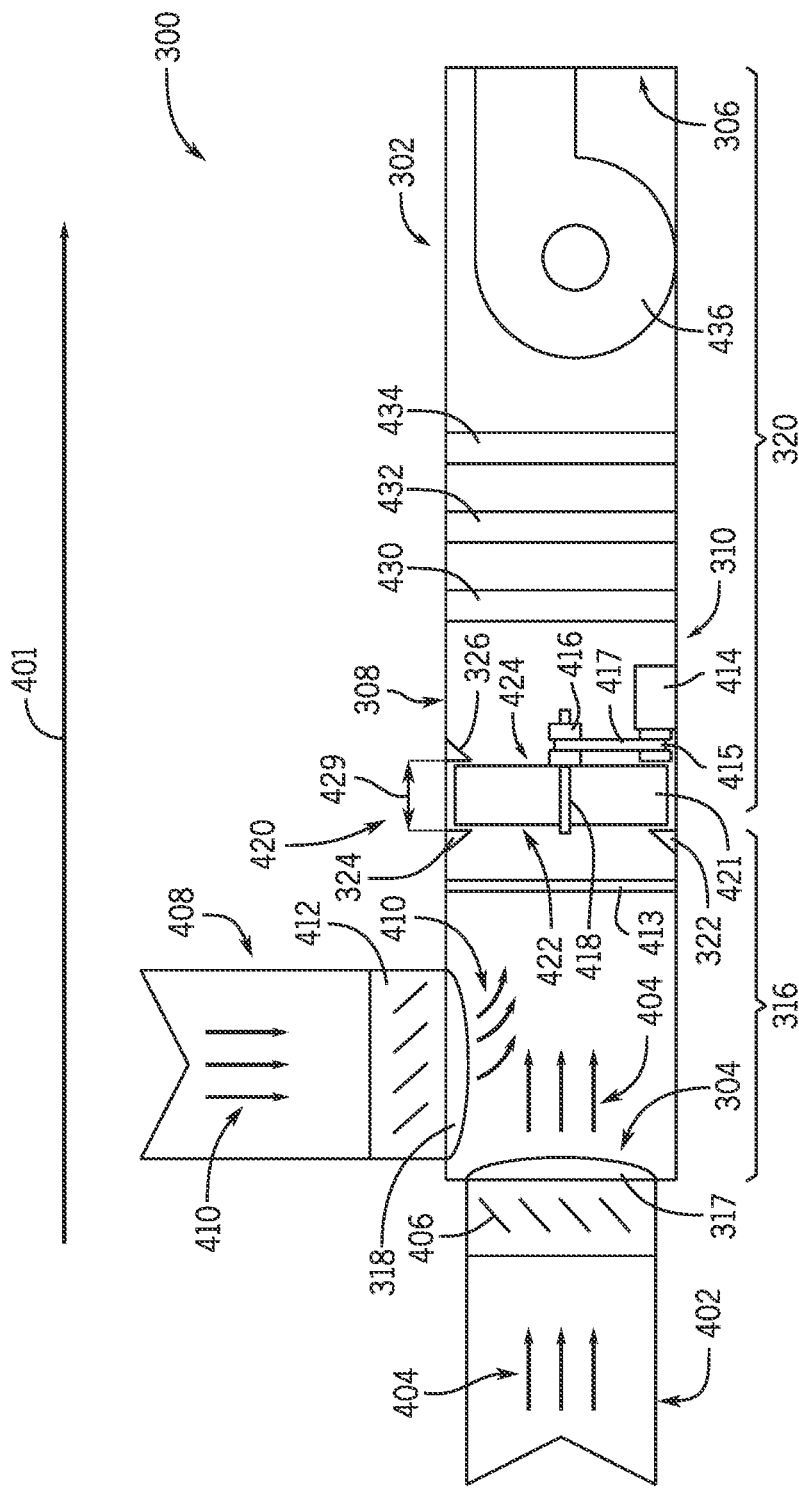
FIG. 3 is a cross-sectional view of an embodiment of an air mixing unit having a rotary air homogenizer, in accordance with an aspect of the present disclosure.

Turning now to FIG. 3, a cross-sectional view of an embodiment of an air mixing unit 300 (e.g., a rotary air homogenizer, air mixing assembly) is shown, in accordance with the present disclosure. The air mixing unit 300 may be incorporated with the AHU 202 or other HVAC system or unit. As illustrated, the air mixing unit 300 includes a first conduit 302 having a first end 304 and a second end 306 generally defined by a first side 308 (e.g., top wall), a second side 310 (e.g., a bottom wall), and two additional side walls (not shown). For example, the first conduit 302 may be a component of the AHU 202 (e.g., supply air duct 212), a terminal unit, or other air handling system in an HVAC system. In some embodiments, the first conduit 302 may be generally circular in shape, while in other embodiments, the first conduit 302 may be polygonal (e.g., square or rectangular) in shape. It should be noted that the embodiments discussed and described herein are not intended to be limiting and that the first conduit 302 may have any suitable shape to enable sufficient mixing of two or more airflows.

The first end 304 of the first conduit 302 may include a mixing chamber 316 configured to receive one or more airflows. For example, one or more additional conduits may be in fluid communication with the mixing chamber 316 via one or more inlets and may direct one or more airflows into the mixing chamber 316. In some embodiments, the mixing chamber 316 may additionally or alternatively receive one or more airflows via an opening or inlet of the first conduit 302 that is in fluid communication with an environment surrounding the air mixing unit 300 (e.g., an ambient or outdoor environment). For example, in the illustrated embodiment, a second conduit 402 (e.g., passage, duct, return air duct, outdoor air duct) is fluidly coupled a first inlet 317 of the first conduit 302 and is configured to direct a first airflow 404 (e.g., outside air, return air, conditioned air) through a first mixing damper 406 and through the first inlet 317 and into the mixing chamber 316 of the first conduit 302. Similarly, a third conduit 408 (e.g., passage, duct, return air duct, outdoor air duct) is fluidly coupled a second inlet 318 of the first conduit 302 and is configured to direct a second airflow 410 (e.g., outside air, return air, conditioned air) through a second mixing damper 412 and through the second inlet 318 and into the mixing chamber 316 of the first conduit 302. However, as noted above, in some embodiments the second conduit 402 and/or third conduit 408 may be omitted, and the first inlet 317 or the second inlet 318 of the first conduit 302 may receive the first airflow 404 and/or second air flow 410 (e.g., from an environment surrounding the air mixing unit 300) via the first mixing damper 406 and/or second mixing damper 412. Further, it should be noted that while two additional conduits are illustrated (e.g., the second conduit 402 and the third conduit 408) in the present embodiment, other embodiments incorporating the air mixing unit 300 may include any number (e.g., 2, 3, 4, 5, 6, or more) of additional conduits and inlets configured to direct a respective airflow into the mixing chamber 316 of the first conduit 302.

As noted above, the mixing chamber 316 may be configured to receive multiple airflows (e.g., return airflows, outdoor airflows), such as from conduits fluidly coupled to the mixing chamber 316 and/or from an environment surrounding the air mixing unit 300. Referring to the embodiment of FIG. 3, upon reaching the mixing chamber 316 of the first conduit 302, the first airflow 404 from the second conduit 402 and the second airflow 410 from the third conduit 408 may combine or mix with one another in the mixing chamber 316 and be directed in a direction 401 towards a rotary air homogenizer 420 (e.g., enthalpy wheel, heat wheel, energy recovery wheel, desiccant wheel) disposed within the first conduit 302. As described further below, the rotary air homogenizer 420 may include a thermal wheel 421 (e.g., enthalpy wheel, heat wheel, desiccant wheel) configured to enable mixing of the first airflow 404 and the second airflow 410 within the first conduit 302. The first conduit 302 may also include a component chamber 320 positioned downstream of the rotary air homogenizer 420 relative to the direction 401. The component chamber 320 may house a fan 436 configured to draw the first airflow 404 and the second airflow 410 across the rotary air homogenizer 420 (e.g., thermal wheel 421) in the direction 401 and towards the second end 306 of the first conduit 302. In some embodiments, the mixing chamber 316 may also include one or more filters 413 disposed within the conduit 302 and configured to reduce an amount of debris and/and particulate matter that may degrade the thermal wheel 421 or interfere with the operation of the thermal wheel 421. For example, the one or more filters 413 may be positioned just upstream of the thermal wheel 421 and may be configured to filter impurities out of the first airflow 404 and/or the second airflow 410. In some embodiments, one or more filters 413 may be associated with each of the inlets 317, 318, and in other embodiments, only one of the inlets (e.g., first inlet 317) may include a filter while the other inlet (e.g., second inlet 318) does not include a filter.

In some embodiments, the component chamber 320 of the air mixing unit 300 may also include a humidifier 430, a heating coil 432, and a cooling coil 434. Further, as noted above, the fan 436 may be disposed near the second end 306 of the first conduit 302 (e.g., downstream of the rotary air homogenizer 420), thereby creating a suction pressure that draws the first and second airflows 404, 410 across the rotary air homogenizer 420 and towards the second end 306 of the first conduit 302 in the direction 401. It should be noted that in some embodiments, the components within the component chamber 320 may be arranged in different configurations, including the placement of one or more components upstream of the rotary air homogenizer 420.

In addition to the thermal wheel 421, the rotary air homogenizer 420 includes a motor 414 that may be operatively coupled to the thermal wheel 421. In operation, the motor 414 may cause the thermal wheel 421 to rotate. For example, the motor 414 may be coupled to a first pulley 415, which transfers rotational force from the motor 414 to a second pulley 416 via a belt 417 (e.g., a chain) coupled to the first pulley 415 and the second pulley 416. The second pulley 416 may be coupled to a shaft 418 (e.g., axle) of the thermal wheel 421. Thus, rotational force may be transferred from the motor 414 to the first pulley 415, from the first pulley 415 to the second pulley 416 via the belt 417, and from the second pulley 416 to the thermal wheel 421 via the shaft 418. In some embodiments, the motor 414 may be directly connected to the thermal wheel 421 (e.g., via the shaft 418), and the first and second pulley 415, 416 may be omitted. Further, although the shaft 418 of the thermal wheel 421 is illustrated as extending within the first conduit 302 of the air mixing unit 300 along the first direction 401, the shaft 418 may alternatively be arranged in another direction and may be rotated in pitch and/or yaw.

In the illustrated embodiment, the thermal wheel 421 includes a first face 422 (e.g., an upstream face, a first side, a receiving face), a second face 424 (e.g., a downstream face, a second side, a discharge face, exiting face), and a plurality of channels (e.g., flow passages) that are configured to enable airflow to pass through. The plurality of channels may be defined or formed in a matrix material of the thermal wheel 421 that extends in a direction cross-wise to the direction 401 (e.g., lateral across and/or within the first conduit 302). For example, upon reaching the first face 422 of the thermal wheel 421 from the mixing chamber 316, the first airflow 404 and/or the second airflow 410 may be divided into a plurality of portions by the plurality of channels (not shown) within the thermal wheel 421. That is, each channel of the plurality of channels is configured to receive a portion of the first airflow, a portion of the second airflow, or both. As the plurality of portions of the first and second airflows 404, 410 are directed through the thermal wheel 421 towards the second face 424 (e.g., via the fan 436), the thermal wheel 421 may rotate, thereby causing the first and second airflows 404, 410 to exit the thermal wheel 421 in a different location (e.g., relative to the first conduit 302). In some embodiments, the thermal wheel 421 may be contained within the first conduit 302 via a plurality of supports 322, 324, 326 of the rotary air homogenizer 420. The plurality of supports 322, 324, 326 are described in more detail with reference to FIG. 5 below. The thermal wheel 421 may also have a length 429, which may vary depending on design considerations of the system in which the rotary air homogenizer 420 is installed. That is, systems disposed or utilized in environments that receive airflows with significantly different temperatures may include the thermal wheel 421 with the length 429 increased to provide additional room for heat exchange and mechanical mixing of the two or more airflows. The thermal wheel 421 may be constructed from steel, aluminum, another heat conducting material, plastic, synthetic fiber, another polymer, another suitable material, or a combination thereof.

Figure 4:
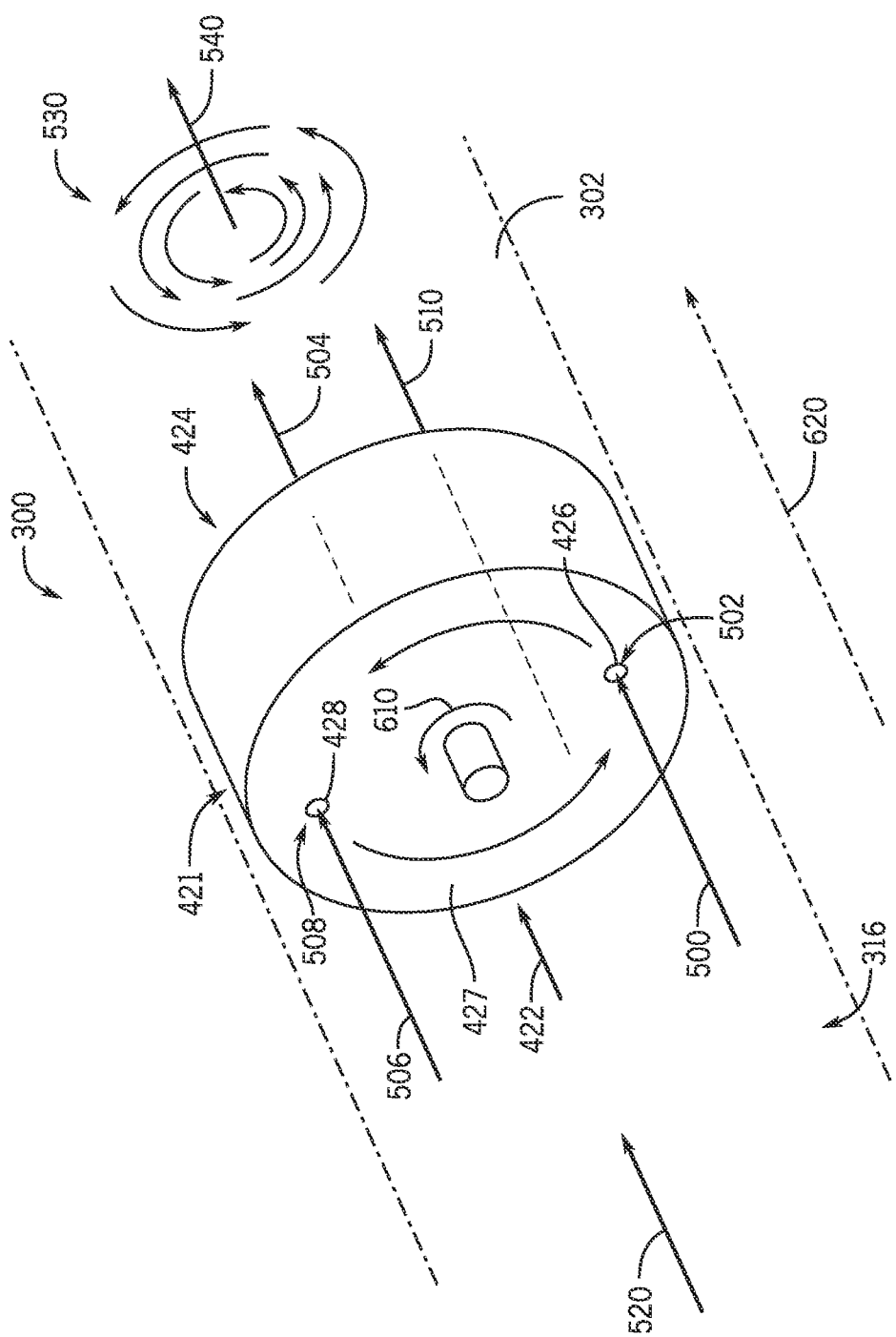
FIG. 4 is an isometric view of an airflow moving through an embodiment of a thermal wheel of a rotary air homogenizer, in accordance with an aspect of the present disclosure.

Turning now to FIG. 4, a perspective view of an embodiment of the thermal wheel 421, illustrating airflows directed across the thermal wheel 421, is shown. As illustrated, a first airflow 500 and a second airflow 506 may move in a direction 620 through the first conduit 302. The first and second airflows 500, 506 may be portions of a stratified airflow 520 which may be representative of the first airflow 404 and/or the second airflow 410 of FIG. 3. The first airflow 500 may reach the first face 422 of the thermal wheel 421 at a first location 502 (e.g., lateral location within the first conduit 302) and may enter a first channel 426 (e.g., passage) of the thermal wheel 421. As the thermal wheel 421 rotates in a direction 610, the first airflow 500 moves through the thermal wheel 421 in the direction 620 towards the second face 424 of the thermal wheel 421. Upon reaching the second face 424 of the thermal wheel 421 (e.g., via the first channel 426), the first airflow 500 exits the thermal wheel 421 at a second location 504 (e.g., lateral location within the first conduit 302) that is different than the first location 502. Similarly, the second airflow 506 may reach the first surface 422 of the thermal wheel 421 at a third location 508 (e.g., lateral location within the first conduit 302) and may enter a second channel 428 (e.g., passage) of the thermal wheel 421. As the thermal wheel 421 rotates in the direction 610, the second airflow 506 moves through the thermal wheel 421 in the direction 620 towards the second face 424 of the thermal wheel 421. Upon reaching the second face 424 of the thermal wheel 421, the second airflow 506 exits the thermal wheel 421 at a fourth location 510 (e.g., lateral location within the first conduit 302) that is different than the third location 508. That is, as the thermal wheel 421 rotates, the portions of the first and second airflows 500, 506 within the first and second channels 426, 428 are diverted by the rotational movement of the thermal wheel 421 to the second location 504 and fourth location 510, respectively, before exiting the first and second channels 426, 428 at the second face 424 of the thermal wheel 421. The rotating motion of the thermal wheel 421 in the direction 610 imparts a lateral velocity to the first and second airflows 500, 506 exiting the first and second channels 426, 428, thereby creating a vortex 530 and turbulence that causes further mixing of portions or volumes of airflows within the first and second airflows 500, 506.

When the stratified airflow 520 (e.g., a combined airflow of the first airflow 500 and the second airflow 506 having less than a threshold degree of mixing) moves or passes through the thermal wheel 421, volumes or portions of airflows that have different temperatures contact different portions (e.g., locations) of the thermal wheel 421. Volumes of air that are warmer than the portion of the thermal wheel 421 contacted deposit heat to the material 427 (e.g., matrix material) of the thermal wheel 421, creating localized heating of that portion. Conversely, volumes of air that are cooler than the portion of the thermal wheel 421 contacted absorb heat from the material 427 of the thermal wheel 421, creating localized cooling of that portion. For example, the first airflow 500 may be warmer relative to the material 427 of the thermal wheel 421 at the location 502 (e.g., portion), and the second airflow 506 may be cooler relative to the material 427 of the thermal wheel 421 at the location 508 (e.g., portion). As the stratified airflow 520 (e.g., first and second airflows 500, 506) moves through the thermal wheel 421, the warmer first airflow 500 may transfer heat to the thermal wheel 421, and the cooler second airflow 506 may absorb heat from the thermal wheel 421. Through this process, different portions of the thermal wheel 421 receive airflows at different temperatures, thereby creating different temperature portions within the thermal wheel 421. The material 427 of the thermal wheel 421 transfers heat energy from heated areas to cooled areas, and in doing so, dissipates localized heating and cooling. Because warmer airflows have deposited heat, and cooler airflows have absorbed heat, the airflow downstream of the thermal wheel 421 is more homogenous, with portions of airflow closer to an average temperature of the overall airflow.

When temperature stratification in the stratified airflow 520 (e.g., portions of an airflow have different temperatures) creates warmed and cooled portions of the thermal wheel 421, the rotating motion of the thermal wheel 421 may expose the warmed and cooled portions to different portions of the airflow. Through this process, a portion of the thermal wheel 421 that is subjected to localized heating may be exposed to a portion of the stratified airflow 520 that contains cooler than average air (e.g., second airflow 506). In this case, heat transfer will occur at a higher rate, due to the larger temperature gradient. Similarly, a portion of the thermal wheel 421 that is subjected to localized cooling will transfer heat at a higher rate with portions of warmer than average air (e.g., first airflow 500). As a result, the stratified airflow 520 may be mechanically mixed by the rotating motion of the thermal wheel 421, and may experience a heat exchange relationship with the material 427 of the thermal wheel 421, thereby creating a discharge airflow 540 that has an increased degree of homogeneity compared to the stratified airflow 520.

In some embodiments, the thermal wheel 421 is a desiccant wheel or may include a desiccant coating that homogenizes the moisture level of one or more airflows. That is, the thermal wheel 421 may operate to homogenize the temperature of one or more airflows as described above, the moisture level of one or more airflows, or both. The construction and operation of a desiccant wheel may be similar to that of the thermal wheel 421. However, a desiccant wheel may include a material or coating that absorbs moisture from humid air and releases moisture to dry air. For example, the first airflow 500 may contain more moisture (e.g., more humid) than the material 427 of the thermal wheel 421 (e.g., desiccant wheel) at the location 502, and the second airflow 506 may contain less moisture (e.g., dryer) than the material 427 of the thermal wheel 421 at the location 508. As the stratified airflow 520 moves through the thermal wheel 421, the more humid airflow 500 may transfer moisture to the thermal wheel 421, and the dryer airflow 506 may absorb moisture from the thermal wheel 421. Through this process, different portions of the thermal wheel 421 receive airflows at different moisture levels, thereby creating different levels of moisture within the thermal wheel 421. Because humid airflows have transferred moisture and dryer airflows have absorbed moisture, the airflow downstream of the thermal wheel 421 is more homogenous, with portions of the discharge airflow 540 closer to the average level of moisture of the overall airflow.

Figure 5:
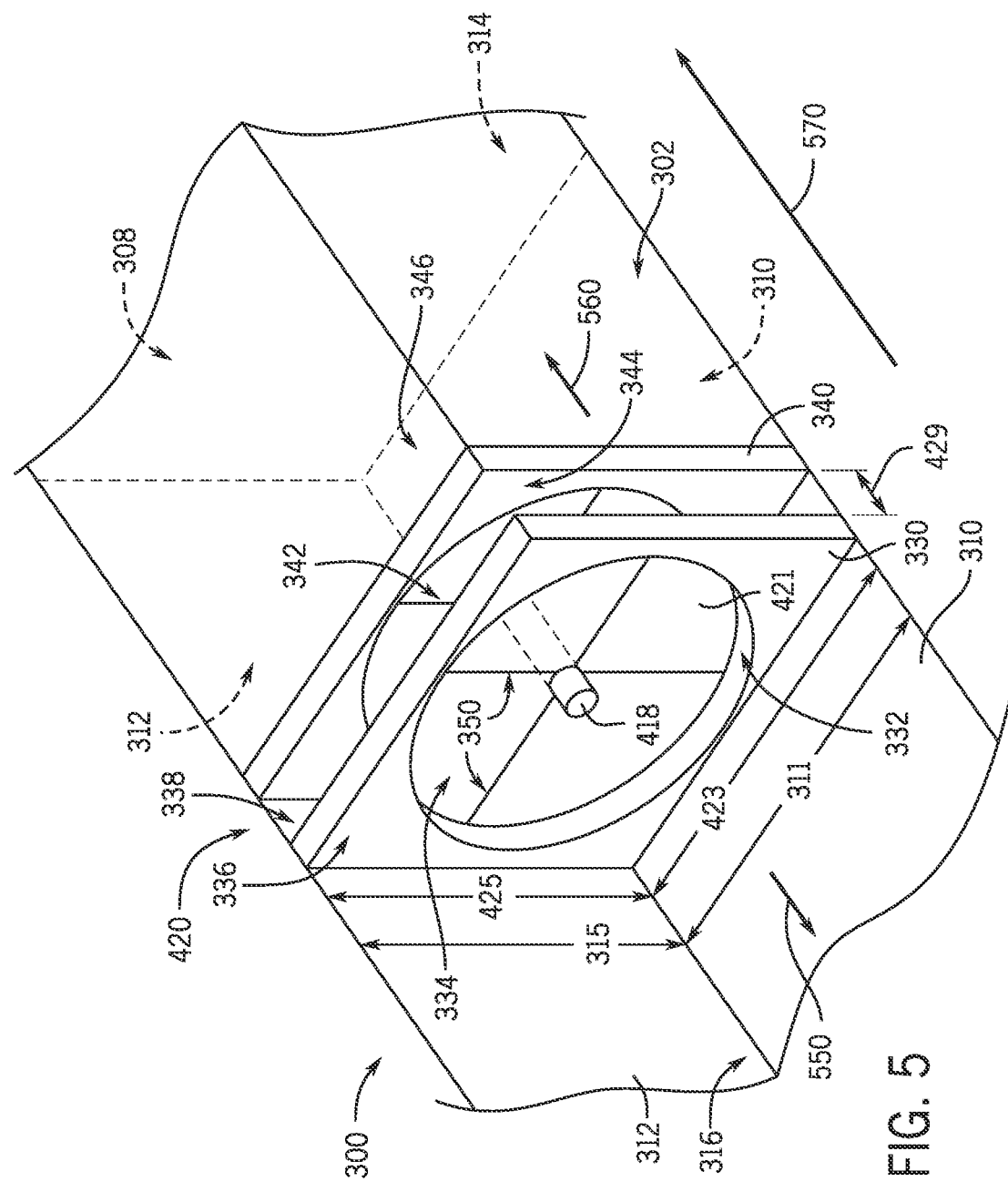
FIG. 5 is an isometric view of an embodiment of a rotary air homogenizer positioned within an air mixing unit, in accordance with an aspect of the present disclosure.

Turning now to FIG. 5, a perspective view of an embodiment of the rotary air homogenizer 420 (e.g., thermal wheel 421) positioned within the air mixing unit 300 is shown, in accordance with the present disclosure. The thermal wheel 421 may be disposed within the first conduit 302, and the first conduit 302 may be defined by a plurality of sides or walls. For example, as noted above, the first conduit 302 may be defined by the first side 308 (e.g., top side, top wall), the second side 310 (e.g., bottom side, bottom wall), a third side 312 (e.g., first side wall, left wall), and a fourth side 314 (e.g., second side wall, right side wall). Each of the sides 308, 310, 312, 314 (e.g., walls) may be coupled together to form the first conduit 302 and may provide structural support for the rotary air homogenizer 420 and any other structural components present within the conduit 302 (e.g., humidifier 430, heating coil 432, cooling coil 434, fan 436 of FIG. 3). The first side 308 and the second side 310 may have or extend a width 311, and the third side 312 and the fourth side 314 may have or extend a height 315. It should be noted that in the illustrated embodiment at an upstream portion 550 of the first conduit 302 (e.g., portion upstream of the rotary air homogenizer 420 relative to a direction 570), the first side 308 (e.g., top side, top wall) and the fourth side 314 (e.g., second side wall, right side wall) are removed for clarity.

The rotary air homogenizer 420 (e.g., thermal wheel 421) may be disposed within the first conduit 302 and may include a first support panel 330 and a second support panel 340 that cooperatively capture the thermal wheel 421. In other words, the first and second support panels 330, 340 may be disposed on opposite sides (e.g., upstream and downstream) of the thermal wheel 421. The first and second support panels 330, 340 may be similar to the plurality of supports 322, 324, 326 of FIG. 3. In some embodiments, the first support panel 330 may have a first side 336 (e.g., an upstream side) and a second side 338 (e.g., a downstream side) and may also include an angled lip 332 (e.g., curved lip) extending from the first side 336 to the second side 338. As the lip 332 extends from the first side 336 to the second side 338 of the first support panel 330, the lip 332 may decrease in diameter. That is, the lip 332 may be narrower on the second side 338 adjacent to the thermal wheel 421 relative to the first side 336, thereby directing an airflow in the mixing chamber 316 through an opening 334 of the first support panel 330 in the direction 570. It should be noted that the second support panel 340 may also have an opening 342, a first side 344 (e.g., an upstream side) and a second side 346 (e.g., a downstream side).

The thermal wheel 421 may be mounted on the shaft 418 (e.g., central axle) via bearings or other suitable features. The shaft 418 may be supported by support struts 350, which may extend across the openings 334, 342 and be secured to the first and/or second support panels 330, 340, to secure the shaft 418 in place. In some embodiments, the shaft 418 may be supported by a sheet of metal that has perforations or other types of holes to allow the passage of air or by some other method. In other embodiments, the first and second support panels 330, 340 may not be present, and the support struts 350 may be directly connected to the sides 308, 310, 312, 314 (e.g., walls) of the first conduit 302. In still other embodiments, the thermal wheel 421 and any other components disposed within the first conduit 302 (e.g., humidifier 430, heating coil 432, cooling coil 434, and fan 436 of FIG. 3) may be integrated into a self-contained housing, which can be slid into place within the first conduit 302 through an opening in one of the sides 308, 310, 312, 314 of the air mixing unit 300, and later removed for replacement, maintenance, and/or repair.

In some embodiments, the thermal wheel 421 may have a diameter 423, 425 (e.g., height, width) that is substantially equal in magnitude (e.g., within 1%, 3%, 5%) to the width 311 of the first and second sides 308, 310 and/or the height 315 of the third and fourth sides 312, 314, thereby enabling the central rotational axis of the thermal wheel 421 (e.g., the shaft 418) to coincide with a cross-sectional center of the first conduit 302. In other embodiments, two or more thermal wheels may occupy portions of the cross section (e.g., lateral cross section) of the first conduit 302. For example, 2, 3, 4, or 5 thermal wheels may be used, each placed at different portions or locations within the first conduit 302. These additional thermal wheels may operate similarly to the thermal wheel 421 and may be operatively coupled to the motor 414 of FIG. 3, or may be driven by independent motors.

Figure 6A:
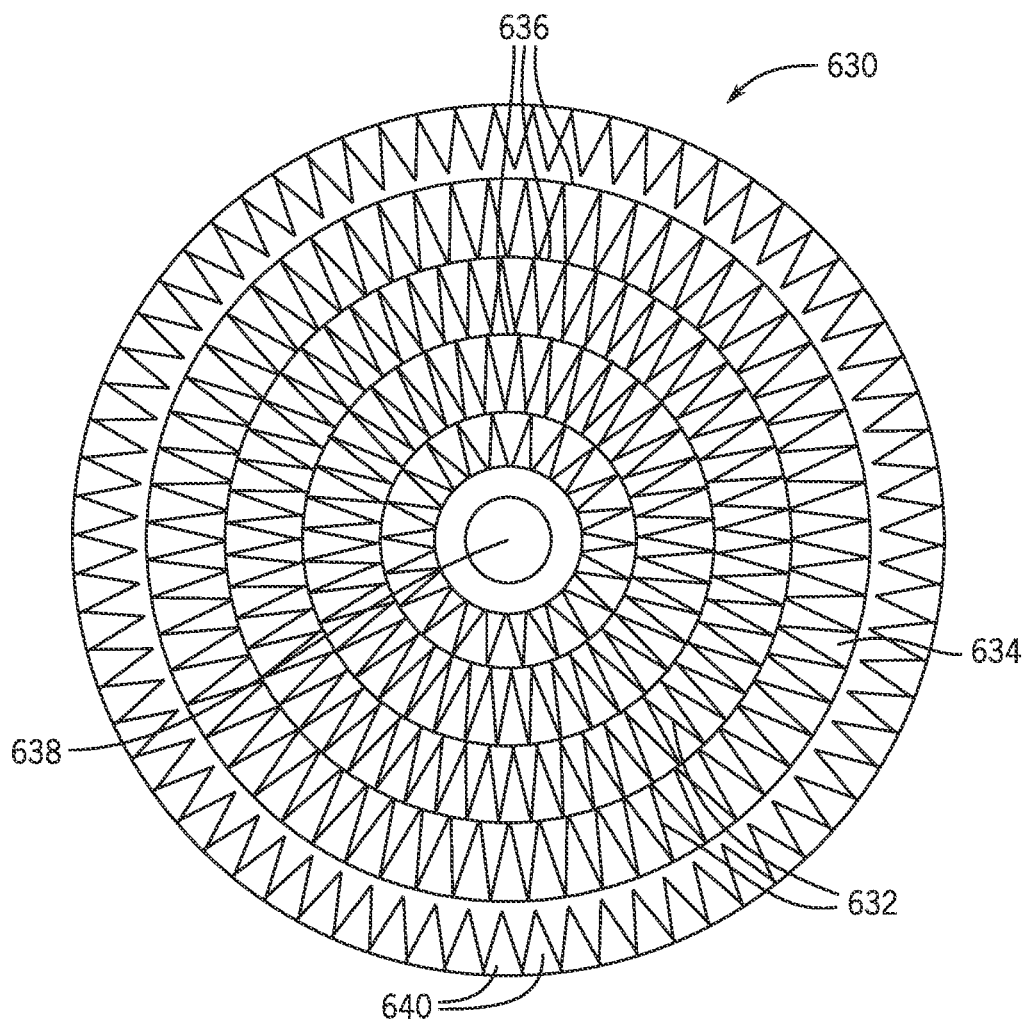
FIG. 6A is a front view of an embodiment of a thermal wheel of a rotary air homogenizer, in accordance with an aspect of the present disclosure.
Figure 6B:
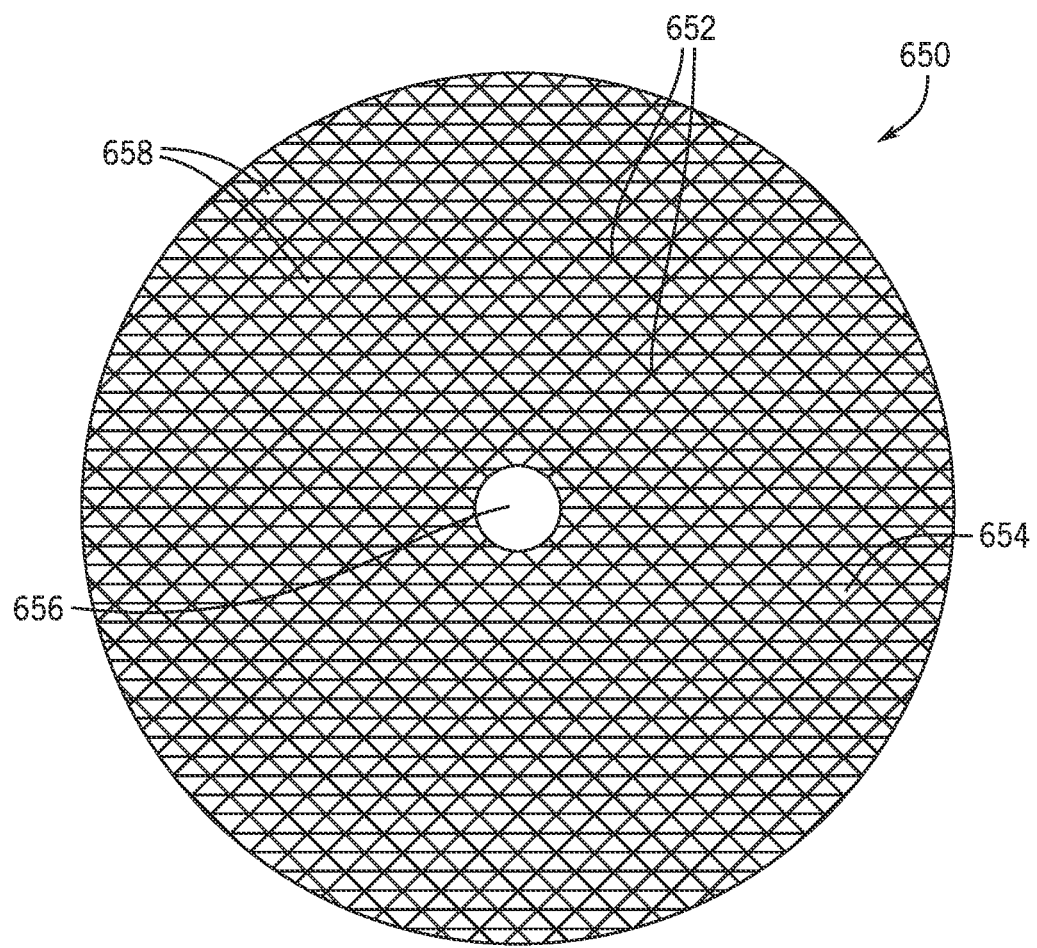
FIG. 6B is a front view of an embodiment of a thermal wheel of a rotary air homogenizer, in accordance with an aspect of the present disclosure.

Turning now to FIGS. 6A and 6B, schematic axial views of embodiments of thermal wheels 630 and 660 are shown, in accordance with the present disclosure. Specifically, FIG. 6A illustrates an embodiment of the thermal wheel 630 formed from layers 632 of corrugated material 634 arranged in concentric rings 636 around a central axis 638 of the thermal wheel 630. Each layer 632 forms triangular-shaped channels 640 that enable the passage of air across the thermal wheel 630. In some embodiments, the layers 632 of corrugated material 634 may form other shapes or configurations, such as a sinusoidal pattern, a square wave pattern, or another pattern, including an irregular pattern. FIG. 6B illustrates an embodiment of the thermal wheel 650 with layers 652 of material 654 arranged laterally (e.g., relative to central axis 656) across the thermal wheel 650 to form a pattern of triangular channels 658 arrayed across the thermal wheel 650. In some embodiments, the channels 658 may be hexagonal, square, circular, or some other shape or combination of shapes. As will be appreciated, other embodiments of the thermal wheel 650 may have any other suitable configuration (e.g., arrangement, shape, number, size, etc.) of channels 658.

Figure 7A:
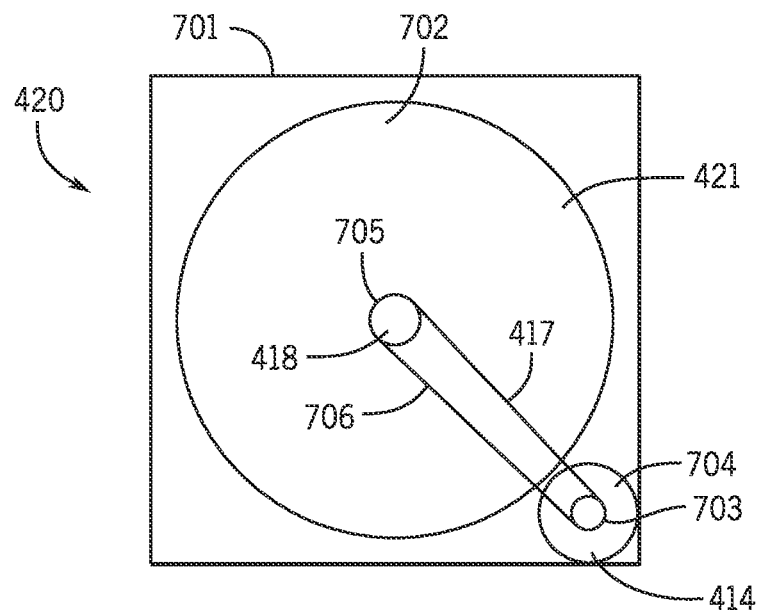
FIG. 7A is a front view of an embodiment of a rotary air homogenizer having a thermal wheel and a motor, in accordance with an aspect of the present disclosure.
Figure 7B:
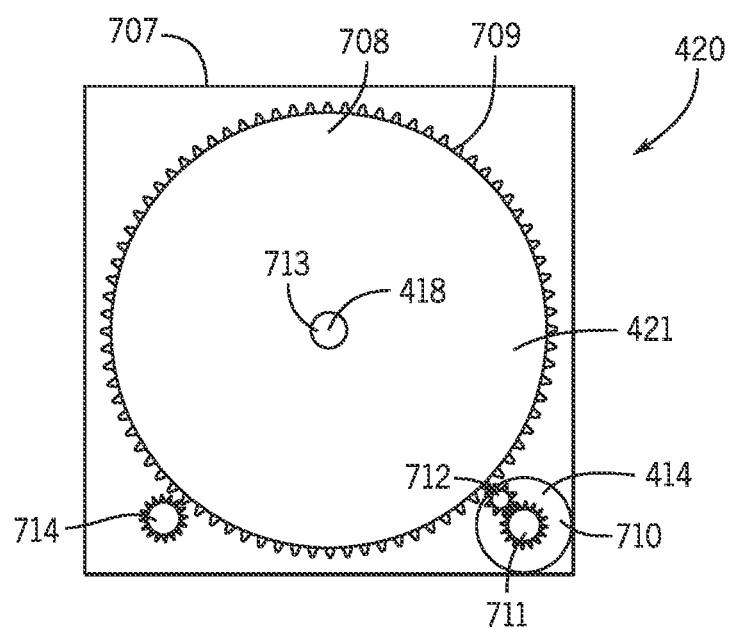
FIG. 7B is a front view of an embodiment of a rotary air homogenizer having a thermal wheel and a motor, in accordance with an aspect of the present disclosure.

FIGS. 7A and 7B are schematics of embodiments of the rotary air homogenizer 420, illustrating the thermal wheel 421, the motor 414, and a drive train (e.g., transmission) 417 operatively coupling the thermal wheel 421 and the motor 414 to enable rotation of the thermal wheel via operation of the motor 414. As illustrated in FIG. 7A, a thermal wheel 702 is positioned within a conduit 701, which may be similar to the first conduit 302 of FIG. 3. That is, the conduit 701 is configured to receive two or more airflows that are jointly directed through the conduit 701 and across the thermal wheel 702. The thermal wheel 702 may be suspended and/or secured within the conduit 701 via one or more support structures (e.g., panels 330, 340). A motor 704 is positioned in a corner of the conduit 701, thereby limiting disruption of an airflow through the thermal wheel 702 caused by the motor 704. The motor 704 (e.g., a motor shaft) is operatively coupled (e.g., rotationally fixed) to a first wheel 703 (e.g., a pulley, roller, disc, ring, sprocket, etc.). When the motor 704 is in operation, rotational force generated by the motor 704 is transferred to the first wheel 703, which transfers the rotational force to a connection 706 (e.g., flat belt, ribbed belt, v-belt, chain, link, cable, etc.) to a second wheel 705. The first and second wheels 703, 705 may be shaped to and engage with the connection 706, for example, to reduce slippage therebetween. In some embodiments, the motor 704 may be located outside of the conduit 701. In other embodiments, the connection 706 may wrap partially around the circumference of the thermal wheel 702 instead of the second wheel 705.

FIG. 7B is a schematic of a thermal wheel 708 having a plurality of teeth 709 disposed around a circumference of the thermal wheel 708. As similarly described above, the thermal wheel 708 is disposed within a conduit 707, such as the first conduit 302 of FIG. 3, and is configured to receive and direct two or more airflows therethrough. A motor 710 is coupled (e.g., rotationally fixed) to a first cog 711 (e.g., toothed cog) and operates to drive the first cog 711. The first cog 711 is engaged with a second cog 712 (e.g., toothed cog) via respective teeth of the first and second cogs 711, 712 to enable transfer of rotational motion from the first cog 711 to the second cog 712. The second cog 712 engages and meshes with the teeth 709 disposed around the circumference of the thermal wheel 708, thereby enabling transfer of rotational motion from the motor 710 to the thermal wheel 708. In some embodiments, the first cog 711 (e.g., teeth of the first cog 711) may directly engage and mesh with the teeth 709, and the second cog 712 may be omitted. The thermal wheel 710 may be supported by a central axle 713 (e.g., shaft), by an additional support cog 714, by a plurality of support cogs, or by some other mechanism or feature. In some embodiments, the cogs 711, 712, and/or 714 may be replaced by wheels, and rotational motion may be transferred between the wheels, such as via frictional engagement.

Figure 8:
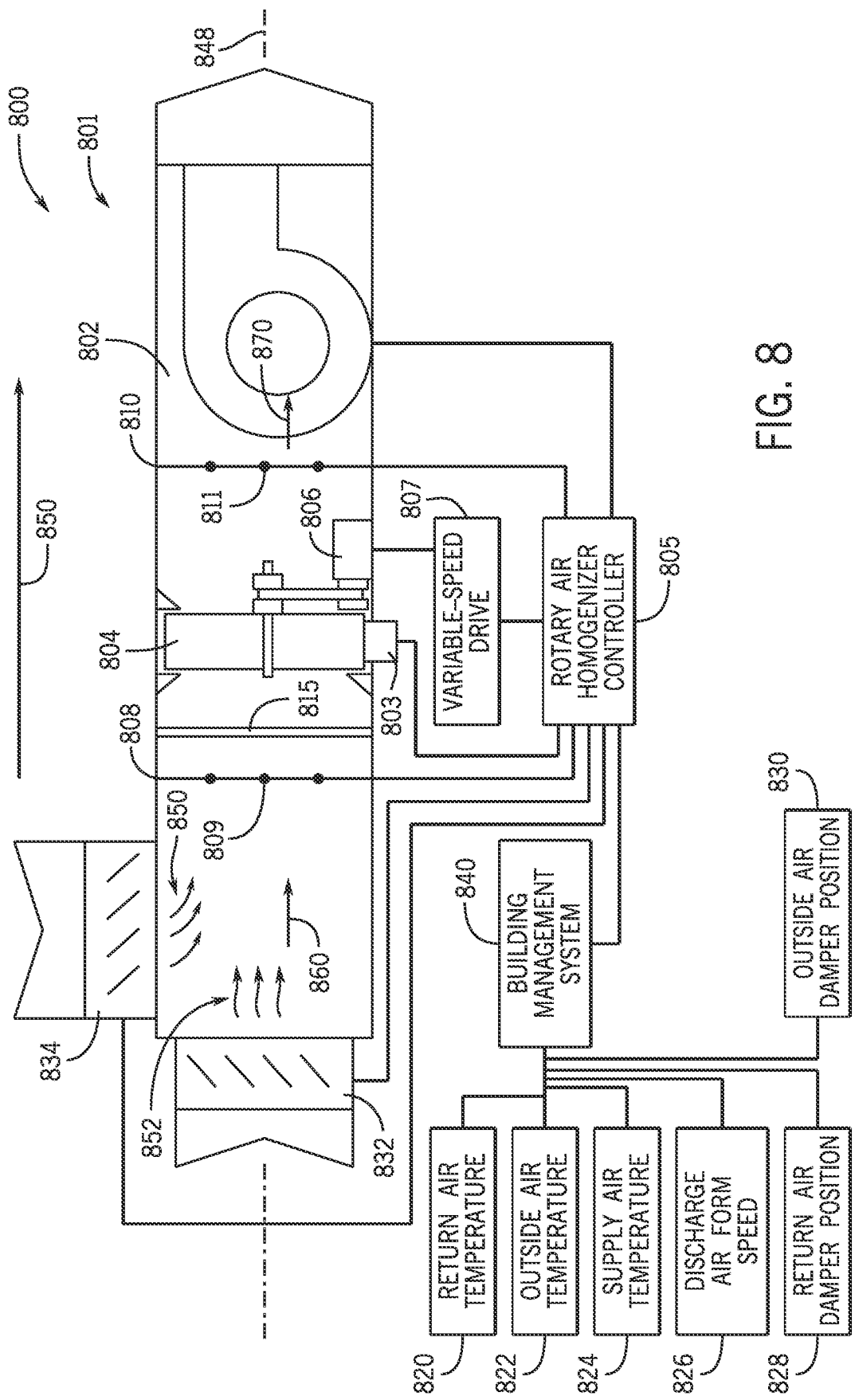
FIG. 8 is a block diagram of an embodiment of an air mixing unit having a rotary air homogenizer and a control system of the rotary air homogenizer, in accordance with an aspect of the present disclosure.

FIG. 8 is a block diagram of an embodiment of an air mixing unit 801 (e.g., air mixing unit 300) having a control system 800 and the rotary air homogenizer 420. That is, the components of the air mixing unit 801 may be similar (e.g., in arrangement and/or function) to the components of the air mixing unit 300 of FIG. 3 (e.g., first conduit 302, thermal wheel 421, second and third conduits 402, 408, dampers 406, 412, motor 414, etc.). As illustrated, the rotary air homogenizer 420 may include a thermal wheel 804 disposed within a first conduit 802 of the air mixing unit 801. A motor 806 may drive rotation of the thermal wheel 804, and the motor 806 may be coupled to a variable speed drive (VSD) 807. In some embodiments, the motor 806 may be a DC motor, and the VSD 807 may provide a pulse width modulation (PWM) control signal to the motor 806 to regulate a speed of the motor 806, and thus a rotational speed of the thermal wheel 804. In other embodiments, the motor 806 may be an AC motor, and the VSD 807 may be a variable frequency drive (VFD). In still other embodiments, the motor 806 may be an electronically commutated motor with an integrated speed controller or other motor configured to operate at one or more speeds.

The control system 800 includes a rotary air homogenizer controller 805, which is configured to regulate operation of the rotary air homogenizer 420. For example, the rotary air homogenizer controller 805 may be configured to control operation of the motor 806 and/or the VSD 807. In some embodiments, the rotary air homogenizer controller 805 may also control operation of other components of the air mixing unit 801, such as a fan (e.g., fan 436), dampers (e.g., dampers 406, 412), and so forth. In some embodiments, operation of the rotary air homogenizer 420 (e.g., via the control system 800 and/or rotary air homogenizer controller 805) may be based on feedback (e.g., sensor feedback) and/or system properties (e.g., an operating mode) of the air mixing unit 801 and/or HVAC system having the air mixing unit 801. Examples of feedback utilized by the control system 800 and/or rotary air homogenizer controller 805 may include, but are not limited to, return air temperature 820, outside air temperature 822, supply air temperature 824, fan speed 826 (e.g., discharge air fan speed), return air damper position 828 of a return air damper 834, and outside air damper position 830 of an outside air damper 832. The feedback may be provided via one or more sensors 809, 811, which may be communicatively coupled to the rotary air homogenizer controller 805, provided by a building management system 840, and/or provided by another source (e.g., AHU controller 230, another controller, a thermostat, etc.).

In some embodiments, an operating speed of the motor 806 may be determined or selected by the control system 800 and/or the rotary air homogenizer controller 805 based on feedback. The rotary air homogenizer controller 805 may then control the VSD 807 to cause the motor 806 to operate at the desired or selected speed. For example, when a return airflow 850 and an outside airflow 852 are directed into the first conduit 802 and a large temperature difference between the return air temperature 820 and the outside air temperature 822 is detected (e.g., via sensors 809), the rotary air homogenizer controller 805 may determine that the thermal wheel 804 is to rotate at a higher rate or speed to provide adequate or desired mixing of the return airflow 850 and the outside airflow 852. As another example, when the discharge air fan speed 826 is low, the airflow through the first conduit 802 may be laminar, which may prolong stratification of the return airflow 850 and the outside airflow 852. Thus, the rotary air homogenizer controller 805 may determine that the thermal wheel 804 is to rotate at a higher rate to provide adequate or desired mixing.

As illustrated, one or more of the sensors 809 may be disposed upstream of the thermal wheel 804 relative to a direction 845 of airflow through the first conduit 802, and one or more of the sensors 811 may be disposed downstream of the thermal wheel 804 relative to the direction 845. The one or more sensors 809, 811 provide the rotary air homogenizer controller 805 with sensor information and data to determine an appropriate or desired rotational speed for the thermal wheel 804. The sensors 809, 811 may be temperature sensors, pressure sensors, humidity sensors, volatile organic compound (VOC) sensors, or another type of sensor. In some embodiments, the one or more sensors 809, 811 may be components of sensor nets 808, 810 (e.g., sensor arrays) which provide a row, column, or a grid of sensors within the first conduit 802. The sensor nets 808, 810 may provide the rotary air homogenizer controller 805 with sensor readings taken from multiple locations (e.g., lateral locations) within the first conduit 802, and thus multiple locations within a stratified airflow 860 (e.g., return airflow and outside airflow) located upstream of the thermal wheel 804 and/or multiple locations within a homogenized airflow 870 (e.g., mixed airflow) located downstream of the thermal wheel 804. In this way, the sensor nets 802, 810 may provide feedback indicative of a degree of stratification of the stratified airflow 860 and/or a degree of homogeneity of the homogenized airflow 870. For example, the sensor net 808, disposed upstream of the thermal wheel 804 relative to the direction 850, may indicate a high level of stratification between the vertical upper and lower levels of the stratified airflow 860 relative to a central axis 848 of the first conduit 802, which may cause the rotary air homogenizer controller 805 to send a command to the rotary air homogenizer 420 to rotate at a higher speed to enable increased mixing of the stratified airflow 860. Conversely, feedback from the sensor net 808 received and processed by the rotary air homogenizer controller 805 may cause the rotary air homogenizer controller 805 to determine that the stratified airflow 860 is above a threshold level or degree of homogeneity. In response, the rotary air homogenizer controller 805 may command the motor 806 to suspend operation to conserve energy.

In some embodiments, the rotary air homogenizer 420 may include a braking mechanism 803 (e.g., brake) to halt rotation of the thermal wheel 804. The braking mechanism 803 may be used in periods of high volumetric flow rate, during transportation of the air mixing unit 801, or in other circumstances to protect the thermal wheel 804 from premature wear and/or degradation. In some embodiments, the rotary air homogenizer controller 805 is communicatively connected to the braking mechanism 803 and is configured to regulate operation of the braking mechanism 803 in response to sensor feedback, such as feedback indicative of a high flow rate of air through the first conduit 802.

In some embodiments, the air mixing unit 801 may include bypass dampers (not shown) configured to enable bypass of airflow around the rotary air homogenizer 420 within the first conduit 802. For example, when reinforced mixing of airflows is not desired, the rotary air homogenizer controller 805 may open bypass dampers to divert airflow around the rotary air homogenizer 420 to increase energy efficiency (e.g., by reducing a pressure drop of the airflow directed through the first conduit 802). Further, in some embodiments, the air mixing unit 801 may include one or more filters 815 disposed within the conduit 801 and configured to capture impurities present within the return airflow 850 or the outside airflow 852.

In accordance with present techniques, feedback provided by downstream sensor 811 or sensor net 810 may be used in a control feedback loop to evaluate homogenization of the airflows directed through the first conduit 802. For example, the rotary air homogenizer controller 805 may include a machine learning algorithm configured to improve operation of the control feedback loop, learn settings or values of feedback provided by the sensors 809, 811 associated with desired homogenization of the homogenized airflow 870, and select a suitable speeds of the motor 806 in response to various sensor 809, 811 detections. It should be noted that the configuration and/or positioning of the one or more sensors 809, 811 and the sensor nets 808, 810 is not limited to those illustrated in FIG. 8. Indeed, any suitable number of sensors and/or sensor nets may be employed to detect values and/or parameters that may be used by the rotary air homogenizer controller 805 to control operation of the rotary air homogenizer 420 and the air mixing unit 801.

Figure 9:
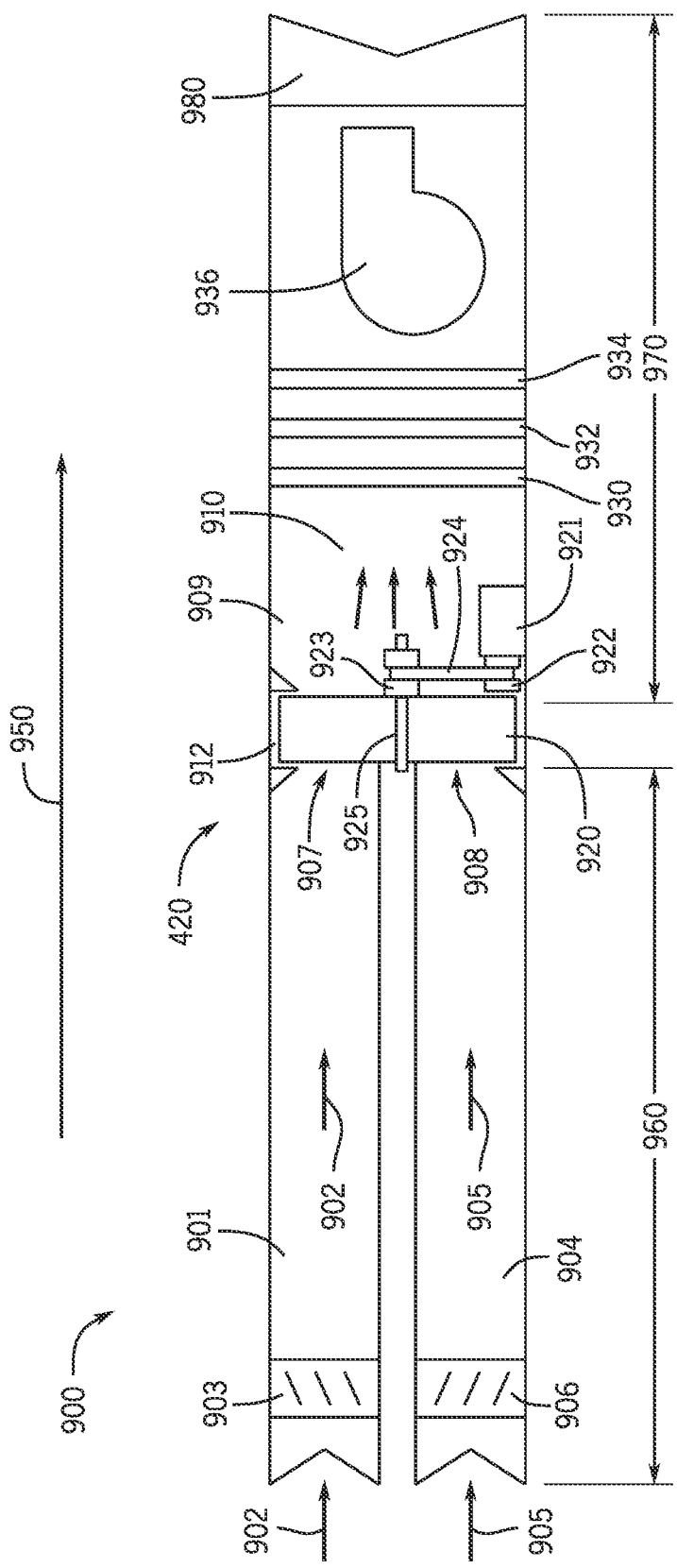
FIG. 9 is a cross-sectional view of an embodiment of an air mixing unit having a rotary air homogenizer, in accordance with an aspect of the present disclosure.

FIG. 9 is a cross-sectional side view of an embodiment of an air mixing unit 900 (e.g., air mixing unit 300) having the rotary air homogenizer 420, in accordance with the present disclosure. As illustrated in FIG. 9, a first airflow 902 (e.g., outdoor airflow, return airflow) may be directed through a first damper 903 into a first conduit 901 (e.g., duct, passage, return air duct, outside air duct), and a second airflow 905 (e.g., outdoor airflow, return airflow) may be directed through a second damper 906 into a second conduit 904 (e.g., duct, passage, return air duct, outside air duct). As with the first and second airflows 404, 410 of FIG. 3, the first and second airflows 902, 905 of FIG. 9 are directed towards a thermal wheel 920 of the rotary air homogenizer 420. However, in the illustrated embodiment, the first and second airflows 902, 905 are separated from one another as they are directed to the thermal wheel 920. In other words, while the second and third conduits 402, 408 of FIG. 3 are configured to direct respective airflows 404, 410 into the mixing chamber 316 of the first conduit 302 where the airflows 404, 410 can be partially mixed prior to reaching the rotary air homogenizer 420, the first and second conduits 901, 904 of FIG. 9 are configured to maintain separation of the first and second airflows 902, 905 while the airflows 902, 905 are in an upstream portion 960 of the air mixing unit 900. That is, airflows 902, 905 may flow in parallel towards the thermal wheel 920 while maintaining separation via the first and second conduits 901, 904.

As illustrated, the thermal wheel 920 may span across and cover a cumulative cross-sectional area (e.g., lateral cross-sectional area extending cross-wise to a direction of the air flows 902, 905) of both the first and second conduits 901, 904. Thus, upon reaching the thermal wheel 920, the first airflow 902 may be directed across the thermal wheel 920 via a first outlet 907 of the first conduit 901, and the second airflow 905 may be directed across a different portion of the thermal wheel 920 via a second outlet 908 of the second conduit 904. As the airflows 902, 905 flow in a direction 950 across the thermal wheel 920 towards a downstream portion 970 of the air mixing unit 900, the airflows 902, 905 may be mixed with one another via operation of the rotary air homogenizer 420 described above. That is, upon traversing the thermal wheel 920, the first and second airflows 902, 905 may be directed into a third conduit 909 where the first and second airflows 902, 905 are combined to form a third airflow 910 (e.g., homogenized airflow) with an increased degree of homogeneity. It should be noted that while two conduits 901, 904 are illustrated, any number of additional conduits may be employed, and the thermal wheel 920 may be configured to span across each of the additional, separate conduits to enable different airflows to enter different portions of the thermal wheel 920. In this way, the thermal wheel 920 enables mixing of stratified airflows in accordance with present techniques. In some embodiments, one or more of the additional conduits may bypass the thermal wheel 920 and may be fluidly coupled to the third conduit 909 to mix with the third airflow 910 (e.g., homogenized airflow) in the downstream portion 970 of the air mixing unit 900.

The thermal wheel 920 may be coupled to a motor 921, which may operate to cause the thermal wheel 920 to rotate within the air mixing unit 900. For example, similar to the motor 414 of FIG. 3, the motor 921 may be coupled to a first pulley 922, which is configured to transfer rotational force from the motor 921 to a second pulley 923 via a belt 924 (e.g., a chain) engaged with the first pulley 922 and the second pulley 923. The second pulley 923 may be coupled to a shaft 925 (e.g., axle) of the thermal wheel 920. Thus, rotational force may be transferred from the motor 921 to the first pulley 922, from the first pulley 922 to the second pulley 923 via the belt 924, and from the second pulley 922 to the thermal wheel 920 via the shaft 925. In some embodiments, the motor 921 may be directly connected to the thermal wheel 920 (e.g., the shaft 925), in place of the first and second pulley 922, 923. Further, although the shaft 925 is illustrated as extending generally parallel with the first and second conduits 901, 904 of the air mixing unit 900, the shaft 925 may also be arranged to enable rotation in pitch and/or yaw. Further, the thermal wheel 920 may be slid into place (e.g., installed within the air mixing unit 900) through an opening 912 in one of the sides (e.g., top side) of the air mixing unit 900. The opening 912 may also enable removal of the thermal wheel 920 and/or other components of the rotary air homogenizer 420 for replacement, maintenance, and/or repair.

Additionally, as similarly described above, the air mixing unit 900 of FIG. 9 may house a number of different components, such as a humidifier 930, a heating coil 932, a cooling coil 934, and a fan 936. The fan 936 may be disposed near an end 980 (e.g., supply air duct) of the air mixing unit 900 and may be configured to draw the first and second airflows 902, 905 through and across the thermal wheel 920 in the direction 950. It should be noted that in some embodiments, the components of the air mixing unit 900 illustrated and described herein may be arranged in different configurations, including the placement of one or more components upstream of the thermal wheel 920 in the upstream portion 960.

It should be noted that the present disclosure predominantly describes the homogenization of two or more airflows, but the principles are equally applicable to other fluids. For example, the system disclosed herein may be implemented within a pipe or other conduit configured to receive two or more liquid flows in order to enable homogenization of a stratified flow of liquid, such as water, liquid coolant, etc.

The rotary air homogenizer with a thermal wheel described herein enables improved mixing and combining of two or more airflows having different temperature and/or humidity levels, thereby increasing the degree of homogeneity and decreasing the degree of stratification in a combined airflow. In this way, the air mixing unit and the rotary air homogenizer described above enable an increase in the efficiency of an HVAC system, enable proper or desired operation of other HVAC system components (e.g., heat exchangers), and/or reduce an overall length (e.g., footprint, size) of the air mixing unit and/or HVAC system.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be noted that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. An air mixing system for a heating, ventilation, and air conditioning (HVAC) system, comprising:
    a conduit defining an airflow path, wherein the conduit is configured to receive a first airflow and a second airflow, to direct the first airflow and the second airflow along the airflow path, and to discharge the first airflow and the second airflow from the airflow path as a mixed airflow via an outlet of the conduit;
    a thermal wheel disposed entirely within the airflow path of the conduit, wherein the thermal wheel is configured to direct the first airflow and the second airflow thereacross, rotate within the conduit, and transfer heat between the first airflow and the second airflow to further mix the first airflow and the second airflow to generate the mixed airflow;
    a mixing chamber disposed upstream of the thermal wheel relative to a direction of the first airflow and the second airflow through the conduit;
    a first inlet configured to receive the first airflow and direct the first airflow into the mixing chamber; and
    a second inlet configured to receive the second airflow and direct the second airflow into the mixing chamber.

2. The air mixing system of claim 1, wherein the first inlet is configured to receive an outside airflow from an ambient environment, and the second inlet is fluidly coupled to a return air duct and is configured to receive a return airflow from a space conditioned by the HVAC system.

3. The air mixing system of claim 1, comprising a motor coupled to the thermal wheel, wherein the motor is configured to transfer a rotational force to the thermal wheel.

4. The air mixing system of claim 1, wherein the thermal wheel comprises a desiccant material configured to transfer moisture between the first airflow and the second airflow.

5. The air mixing system of claim 1, wherein the thermal wheel is coupled to a first support panel positioned upstream of the thermal wheel relative to the direction of the first airflow and the second airflow through the conduit, and a second support panel positioned downstream of the thermal wheel relative to the direction of the first airflow and the second airflow through the conduit, wherein the first support panel and the second support panel cooperatively support the thermal wheel within the conduit.

6. The air mixing system of claim 1, comprising:
    a component chamber disposed downstream of the thermal wheel relative to the direction of the first airflow and the second airflow through the conduit; and
    a heating coil disposed within the component chamber, wherein the heating coil is configured to modify a parameter of the mixed airflow.

7. The air mixing system of claim 6, comprising a cooling coil, a humidifier, or both disposed within the component chamber and configured to modify an additional parameter of the mixed airflow.

8. The air mixing system of claim 6, comprising a fan disposed within the component chamber, wherein the fan is configured to draw the first airflow and the second airflow through the conduit and across the thermal wheel.

9. The air mixing system of claim 1, wherein the thermal wheel comprises:
    a first face;
    a second face; and
    a plurality of channels extending between the first face and the second face, wherein each channel of the plurality of channels is configured to receive the first airflow, the second airflow, or both.

10. The air mixing system of claim 9, wherein the thermal wheel comprises a matrix material extending between the first face and the second face, and the matrix material comprises the plurality of channels formed therein.

11. An air mixing unit for a heating, ventilation, and air conditioning (HVAC) system, comprising:
    a conduit defining an airflow path, the conduit comprising a first inlet configured to receive a first airflow and a second inlet configured to receive a second airflow, wherein the conduit is configured to direct the first airflow and the second airflow along the airflow path in a flow direction;
    a mixing chamber disposed within the conduit, wherein the first inlet is configured to direct the first airflow into the mixing chamber, and the second inlet is configured to direct the second airflow into the mixing chamber to combine the first airflow and the second airflow within the mixing chamber;
an enthalpy wheel disposed entirely within the airflow path of the conduit and downstream of the mixing chamber relative to the flow direction, wherein the enthalpy wheel is configured to rotate within the conduit and transmit the first airflow and the second airflow therethrough to further mix the first airflow and the second airflow to generate a mixed airflow; and
a motor coupled to the enthalpy wheel, wherein the motor is configured to induce rotation of the enthalpy wheel.

12. The air mixing unit of claim 11, wherein the first inlet is fluidly coupled to a return air duct configured to direct a return airflow through the first inlet as the first airflow, and wherein the second inlet is fluidly coupled to an ambient environment and is configured to receive an outdoor airflow as the second airflow.

13. The air mixing unit of claim 11, comprising:
a component chamber disposed downstream of the enthalpy wheel relative to the flow direction; and
a humidifier disposed within the component chamber, wherein the humidifier is configured to modify a parameter of the mixed airflow.

14. The air mixing unit of claim 11, comprising one or more sensors disposed within the conduit, wherein the one or more sensors are configured to provide feedback indicative of a temperature of the first airflow, the second airflow, the mixed airflow, or a combination thereof.

15. The air mixing unit of claim 14, wherein a first sensor of the one or more sensors is disposed upstream of the enthalpy wheel relative to the flow direction, and a second sensor of the one or more sensors is disposed downstream of the enthalpy wheel relative to the flow direction.

16. The air mixing unit of claim 15, comprising a controller communicatively coupled to the motor and the one or more sensors, wherein the controller is configured to regulate operation of the motor based on the feedback.

17. A heating, ventilation, and air conditioning (HVAC) system, comprising:
a conduit defining an airflow path and comprising a first end and a second end, wherein the conduit is configured to direct a first airflow and a second airflow through the airflow path of the conduit in a flow direction from the first end to the second end;
a rotary air homogenizer disposed entirely within the airflow path of the conduit between the first end and the second end, wherein the rotary air homogenizer is configured to receive the first airflow and the second airflow, transfer heat between the first airflow and the second airflow, and rotate to impart a lateral velocity to the first airflow and the second airflow to generate a mixed airflow comprising the first airflow and the second airflow, wherein the second end of the conduit is configured to discharge the mixed airflow to a conditioned space;
one or more sensors disposed within the conduit, wherein the one or more sensors are configured to provide feedback indicative of a temperature of the first airflow, the second airflow, the mixed airflow, or any combination thereof; and
a controller communicatively coupled to the rotary air homogenizer and the one or more sensors, wherein the controller is configured to regulate operation of the rotary air homogenizer based on the feedback.

18. The HVAC system of claim 17, wherein the rotary air homogenizer comprises a thermal wheel and a motor configured to rotate the thermal wheel within the conduit, wherein the controller is configured to control a speed of the motor based on the feedback.

19. The HVAC system of claim 17, wherein the one or more sensors comprise a first sensor disposed upstream of the rotary air homogenizer relative to the flow direction and a second sensor disposed downstream of the rotary air homogenizer relative to the flow direction.

20. The HVAC system of claim 17, comprising a filter disposed within the conduit upstream of the rotary air homogenizer relative to the flow direction.

\* \* \* \* \*